United States Patent [19]
Chang

[11] Patent Number: 5,681,490
[45] Date of Patent: Oct. 28, 1997

[54] LASER WELD QUALITY MONITORING SYSTEM

[76] Inventor: Dale U. Chang, 2900 Sun Bittern Ct., Windermere, Fla. 34786

[21] Appl. No.: 529,679

[22] Filed: Sep. 18, 1995

[51] Int. Cl.$^6$ .................................................. B23K 26/00
[52] U.S. Cl. ............................... 219/121.64; 219/121.83
[58] Field of Search .......................... 219/121.63, 121.64, 219/121.83, 121.14

[56] References Cited

U.S. PATENT DOCUMENTS

| | | | |
|---|---|---|---|
| 5,045,669 | 9/1991 | Ortiz, Jr. et al. | 219/121.83 |
| 5,183,989 | 2/1993 | Sanders et al. | 219/121.14 |
| 5,272,312 | 12/1993 | Jurca | 219/121.83 |

Primary Examiner—Geoffrey S. Evans
Attorney, Agent, or Firm—James H. Beusse

[57] ABSTRACT

A method is provided for monitoring of the progression and the quality of laser material processing. Sensors and detectors are placed in the vicinity of reaction area to capture the signatures of material processing. The signals include light, temperature, sound, gas, smoke, vapor, particles, etc. emanating from the reaction area. The intensity and the timing of certain signals indicate the stages of the processing and the processing quality. One example of this invention is the use of photodiode sensors to monitor the progression of laser spot welding of a certain electronic component. Three photodiode sensors are used to monitor the laser pulse, the reflected beam, and the transmitted beam. A computer analyzes these signals in real time to determine the progressive stages of the laser welding process and the expected weld quality.

14 Claims, 9 Drawing Sheets

LASER WELD QUALITY MONITORING SYSTEM

BACKGROUND OF THE INVENTION

This invention relates in general to process monitoring techniques and, more specifically, to methods for monitoring laser material processing for inspection and quality assurance.

There has been a great need for a device that enables monitoring of the physical and/or chemical changes happening in laser material processing to control such processing as well as to determine the quality of the processing. Laser material processing includes, among other processing, processing to deform, alter, change, shape, melt, cut, drill, combine, separate, sort and mix materials to accomplish a certain change of the material shape or property. Typical examples of specific laser material processing include welding, cutting, drilling, soldering, marking, engraving, heat treating, shock hardening, cladding, surface alloying, laser-assisted chemical processing, and laser casting (prototype manufacturing).

Nowadays, laser material processing has become a common manufacturing practice in a high volume, automated production. The need for a "smart" laser system has increased tremendously as more lasers are used in a mass production environment and the demand for high quality processing has increased. A "smart" or "intelligent" system is desired to monitor the process and to control the processing parameters automatically to produce optimum results for quality parts.

This type of monitoring/control system will open the door to improved product quality, increased productivity and cost savings, especially in an automated high volume production situation. Unfortunately, such a "smart" system has not been available so far.

Previous attempts to monitor laser processing have not been successful in predicting the outcome of the processing quality effectively. It is believed that the main reason for this deficiency is that previous monitoring techniques have not monitored the processing states which are closely correlated to the outcome or quality of the processing, i.e., monitoring has not been implemented for determining the quality of the processing at the laser-material interface.

SUMMARY OF THE INVENTION

Among the several objects of this invention are to provide a method of monitoring the progression of laser material processing in real time, to provide a method of determining the quality of the processing, and to provide a method of correcting problems automatically.

In accordance with the present invention, a method is provided for sensing and interpreting signals from the reaction area of laser material processing to enable the system to determine the quality of the processed materials. The method provides intelligence to the system. The method includes the selection of sensors, locations of sensors, collection of signal data, interpretation of the data, decision making process, and corrective action.

BRIEF DESCRIPTION OF THE DRAWINGS

For a better understanding of the present invention, reference may be had to the following detailed description taken in conjunction with the accompanying drawings in which:

FIG. 5 is a representation of one type of

DETAILED DESCRIPTION OF THE INVENTION

Figure 1:
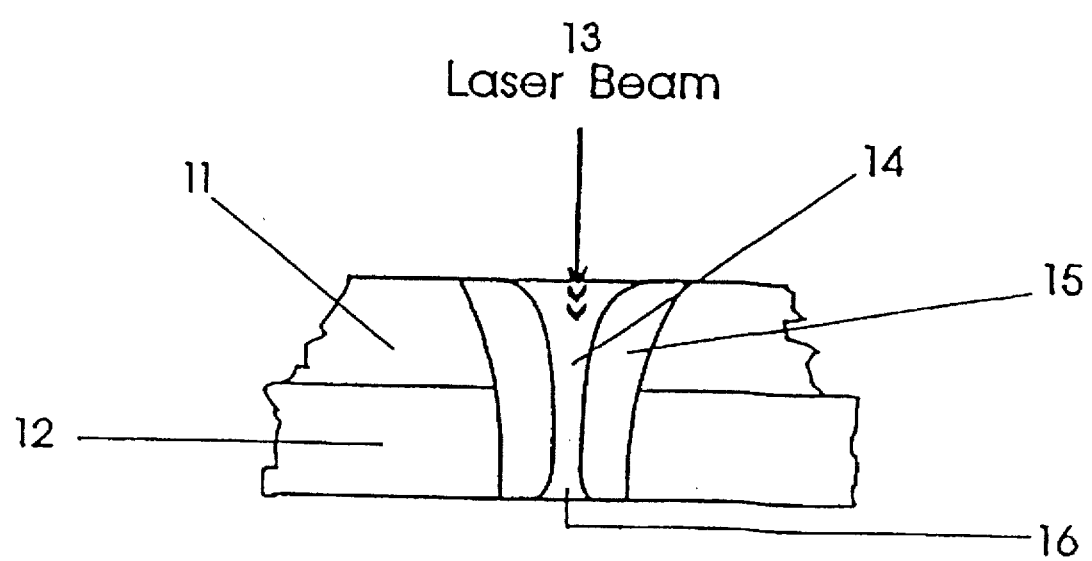
FIG. 1 is a typical laser spot welding with a keyhole.

The present invention is illustrated in a laser processing application for joining two metal parts by welding. In particular, FIG. 1 shows a typical weld joint for spot welding of two sheets 11 and 12 of metal. A laser 10 produces a beam 13 of sufficient intensity for welding, which beam is directed on to the overlapping metal pieces 11 and 12. The metal of the sheets 11 and 12 is heated to melting and the vapor pressure from this intense melting creates a keyhole 14, which is surrounded by molten metal 15. A portion of the beam 13 is transmitted through the opposite side (exit side) 16 of the keyhole 14. When the beam intensity tapers off, the keyhole 14 is closed by the surface tension of the molten metal, and the welding cycle is completed. A defective weld can occur because of too little or too much laser energy, either in time duration or in intensity. If too little energy is applied, the keyhole will not form and the weld may be incomplete or non-existent. If too much energy, the keyhole will be burned and may not close so that a weld nugget does not form and the weld is weak.

Figure 2:
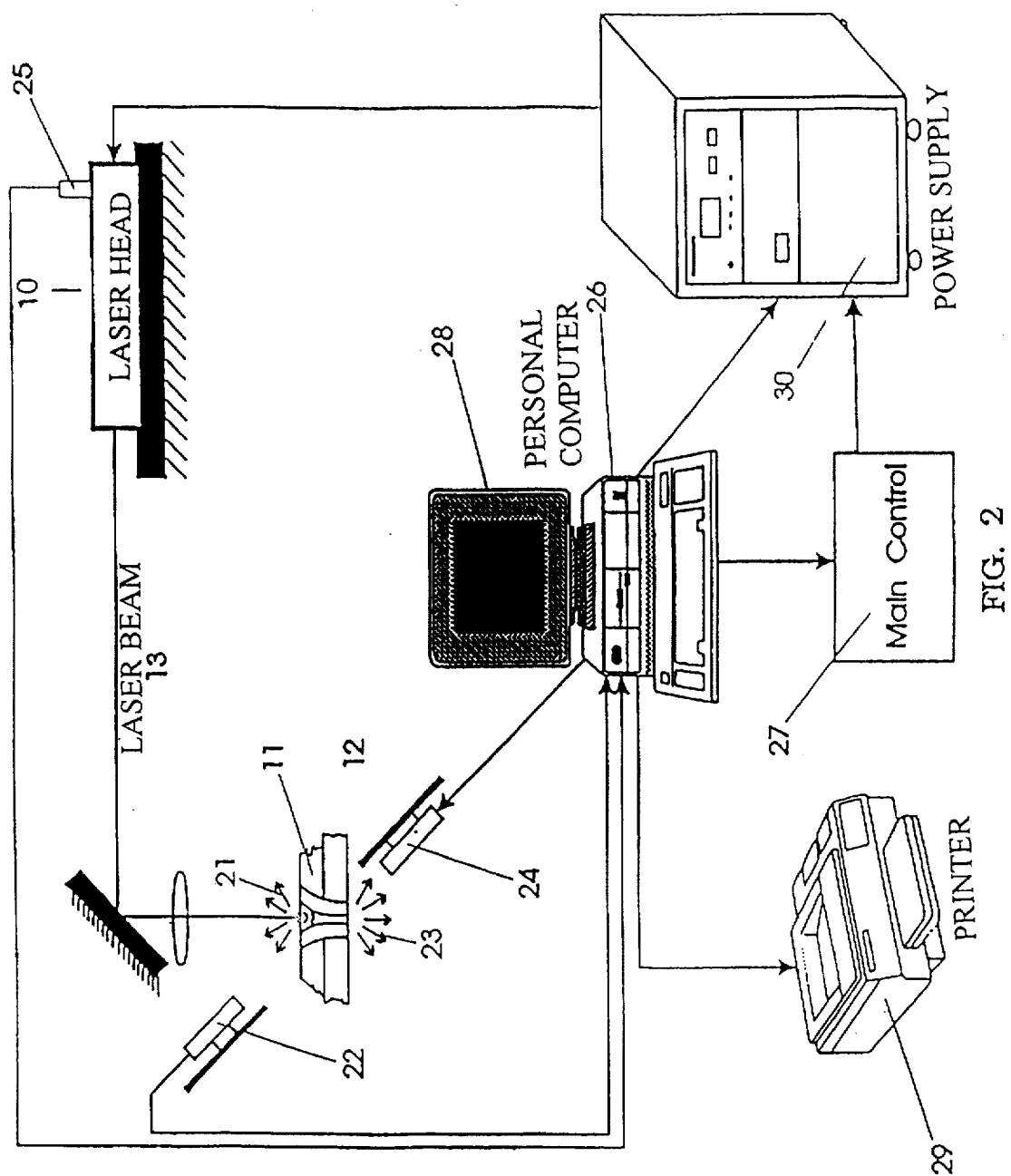
FIG. 2 is a block diagram of a photodetector-based weld quality monitoring system.

FIG. 2 shows an example of one embodiment of the invention as adapted for monitoring/controlling the processing of FIG. 1. The apparatus is a laser weld quality monitoring system in accordance with the method of the present invention. When metal sheets 11 and 12 are welded by laser beam 13, a part of the laser beam is reflected as indicated by arrows 21. A reflection sensor 22 is positioned to detect at least a portion of the reflected laser energy. A transmission sensor 24 is positioned to detect at least a portion of the laser energy of beam 13 passing through keyhole 14 as indicated by arrows 23. A laser cavity sensor 25 provides a signal representative of the intensity of the laser pulse on beam 13. A personal computer 26 samples the data from sensors 22,24 and 25, and analyzes the data to judge the quality of the weld.

The computer sends weld quality data through a conventional data port to a main controller 27. The data can be displayed on a monitor 28 or printed out through a printer 29.

The computer 26 can also send corrective signals based on the weld quality data to laser power supply 30 with the data being effective to cause the laser 10 to fire again with an increased power if necessary to obtain a full-penetration weld.

Figure 3A:
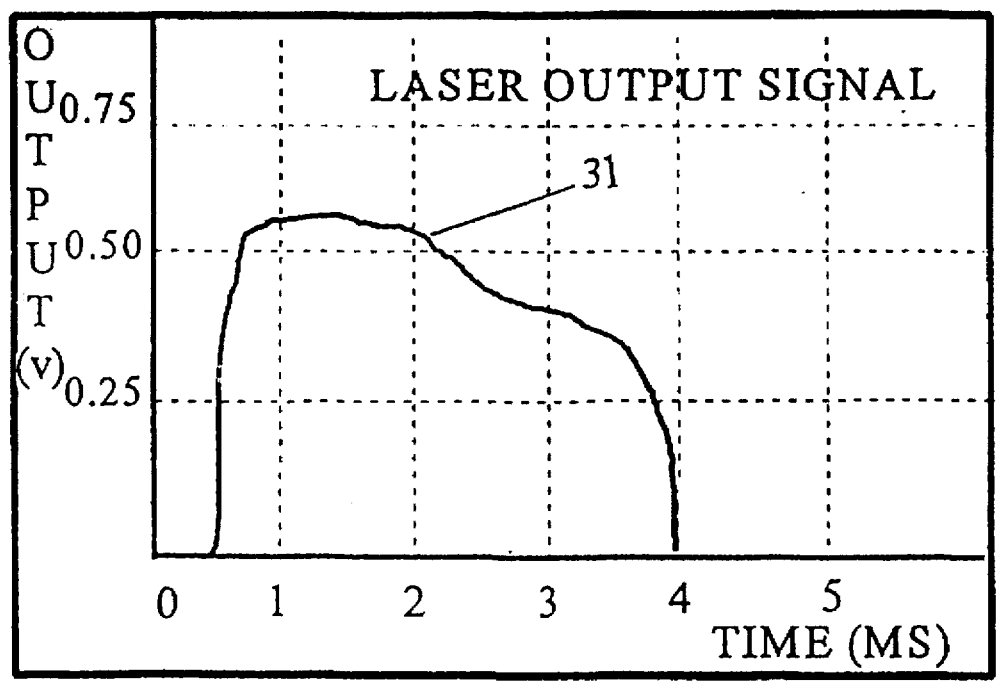
FIGS. 3A–3C are representations of typical weld signatures of the laser pulse, reflected beam, and transmitted beam, respectively.
Figure 3B:
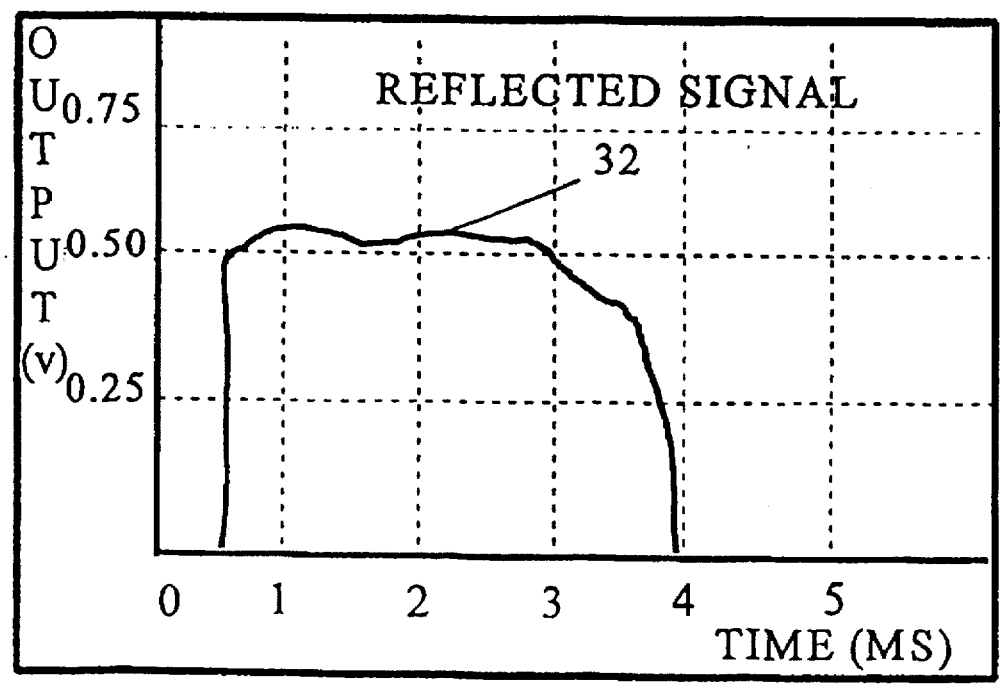
Figure 3C:
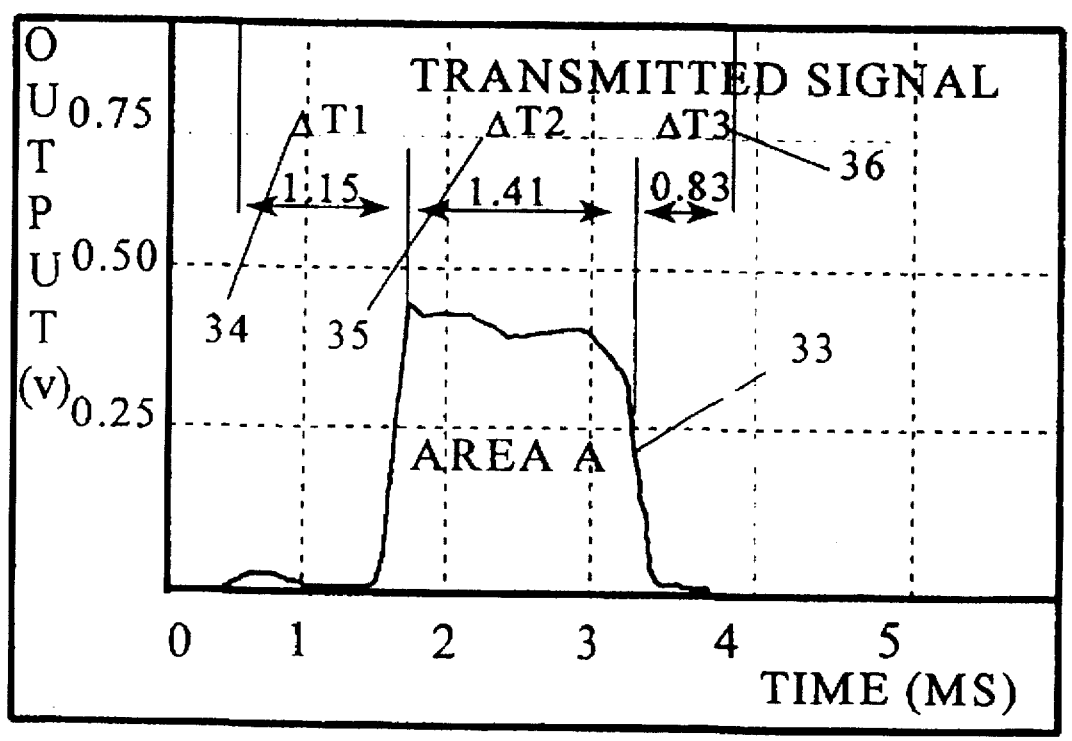

FIGS. 3A–3C are characteristic waveforms or energy envelopes associated with laser beam 13 as it is used to weld sheets 11 and 12. FIG. 3A illustrates at 31 the energy profile for beam 13 as sensed by sensor 25. FIG. 3B illustrates at 32 the energy profile of the reflected signal 21 as sensed by sensor 22. FIG. 3C illustrates at 33 the energy profile of the through transmitted beam represented by arrows 23 and as sensed by sensor 24. The area under the curve 31 represents the laser output energy, the area under curve 32 the reflected energy, and the area A under curve 33 the transmitted energy.

The presence of the area 31 indicates that the laser 10 was fired. The presence of area 32 indicates that the laser beam 13 reached the work piece 11. The area 33 shows that the laser beam penetrated the work piece 11 and 12. In FIG. 3C, the time, ΔT1 between the starting point of the reflected signal 32 and the transmitted signal 33 is the time required to melt through the work pieces 11 and 12.

The time, ΔT2 is the time that the keyhole 14 remained open. The time ΔT3 is the time needed to fill the keyhole 14. When the laser pulse 31 starts tapering off, the vapor pressure in the keyhole 14 is not high enough to maintain the keyhole open. Thus, the molten metal 15 around the keyhole 14 fills the keyhole. This completes the laser welding cycle. One can deduce the states of the welding cycle, i.e., the welding processing, by analyzing the weld signatures or profiles 31,32 and 33.

In the present invention, the computer monitor 26 can be taught to remember different signatures that represent different weld quality in the "teach mode" of its operation. In this mode, the weld signatures of predetermined welding conditions are captured and this data is stored and cross-referenced to corresponding weld quality information. These standard signatures or "templates" are stored in the computer memory for future comparison with incoming signatures in the "monitor mode" of operation.

The comparison of the incoming signatures with the stored signatures (templates) in the "monitor mode" allows one to deduce the welding states that the welding process went through, and the corresponding weld quality after the weld cycle is completed.

The following is an example of decision criteria that might be used in spot welding of two pieces of metals.

If Δ T1 is less than a certain standard value (t1), there are at least three possible faults—laser beam energy set too high (determinable by sensor 25); sheet 11 is less than nominal thickness or an improper material (determined by physical inspection) or sheet 12 is not overlapped by sheet 11. If ΔT1 is zero, there was no work piece in the path of the beam. The value of ΔT1 at nominal laser energy is related to the depth of laser beam penetration.

If ΔT2 does not exist, the laser beam did not penetrate the work piece. The value of Δ T2 or the area "A" is related to the exit-side diameter of the weld.

If Δ T3 is smaller than a certain standard value (t3), a partially drilled hole is expected rather than a weld. The absence of Δ T3 indicates that a hole was created rather than a weld (i.e., the keyhole did not close).

If a broad band photodiode sensor is used for sensors 22 and 24, burning of materials around the weld can also be detected.

Figure 4:
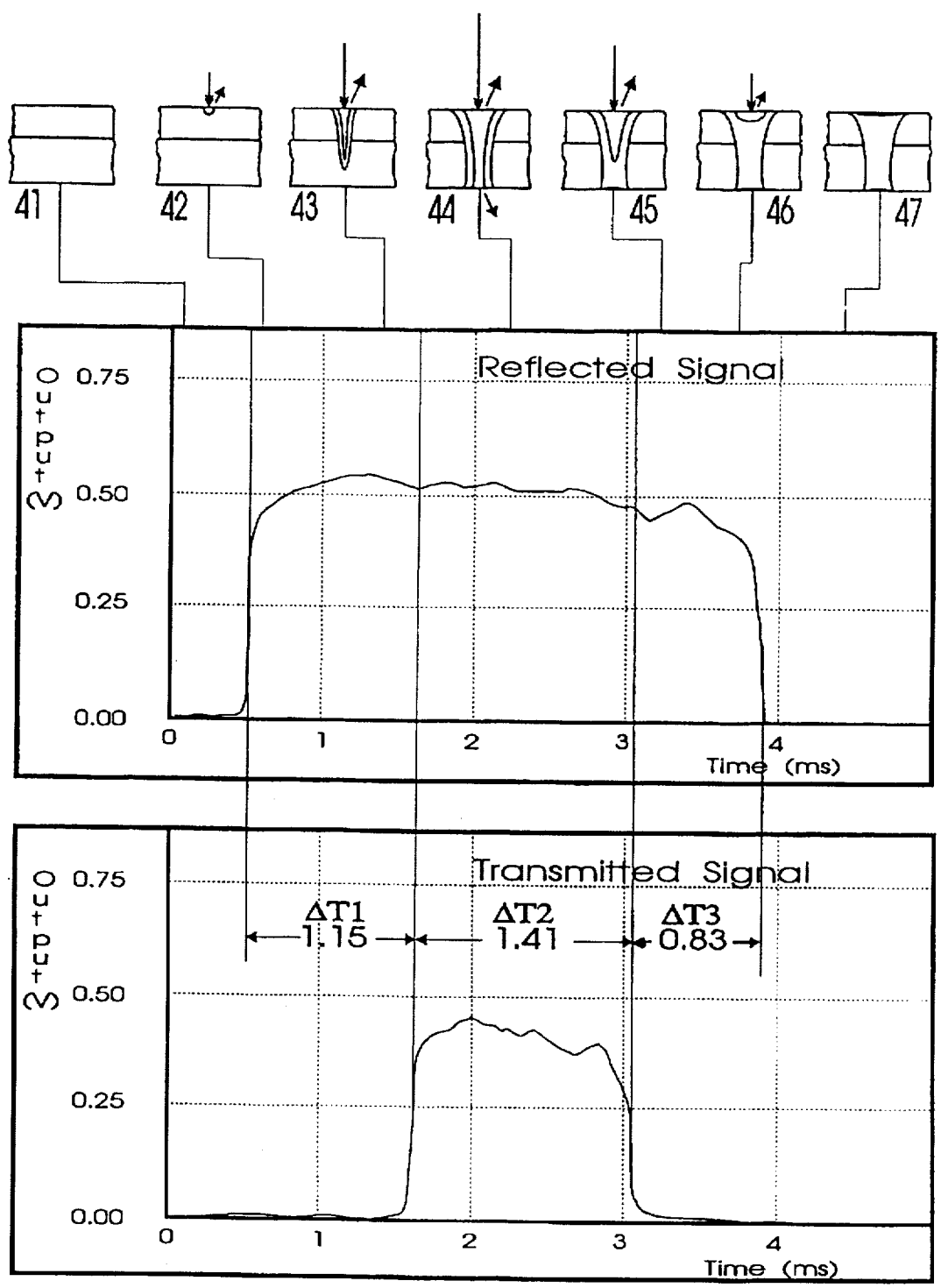
FIG. 4 is a representation of progressive states of laser spot welding in relation to "Good/Acceptable" weld signatures.

FIG. 4 shows the progressive states of laser welding of two-pieces of metal 11,12 in a lap weld with the two-sensor system of FIG. 2. The progressive stages are shown in relation with the timing of the two energy profiles or weld signatures of reflected and transmitted energy. Stage 41 shows a two-piece lap joint before welding; stage 42 shows 0.5 ms after the laser beam is initiated; stage 43 shows a keyhole developing during time ΔT1; stage 44 shows the keyhole penetrating through the work pieces during time ΔT2; stage 45 shows keyhole closure at the start of ΔT3; stage 46 shows the keyhole completely closed during time ΔT3 and stage 47 shows the beam turned off and the welding cycle completed.

The signatures in FIG. 4 shows that it took 1.15 ms (ΔT1) to penetrate both pieces, the keyhole remained open for 1.41 ms (ΔT2), the keyhole closed in 0.83 ms (Δ/T3), and the total weld time was 3.39 ms. The signatures shown in FIG. 4 represent a "Good/Acceptable" weld.

Figure 5:
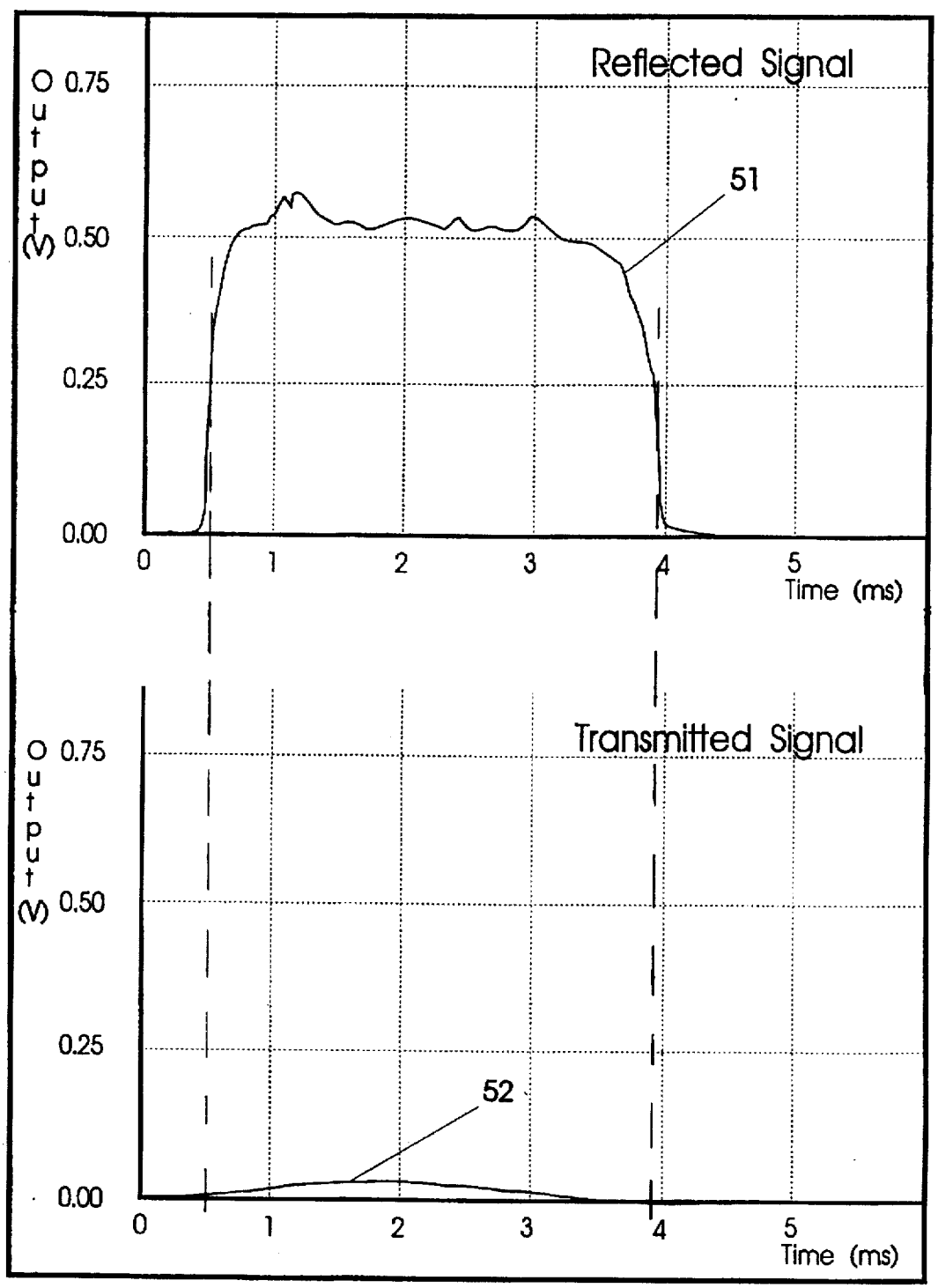

FIG. 5 is a set of weld signatures of one form of "Bad/Unacceptable" weld. Note that the reflected signal 51 is present but the transmitted signal 52 is indicative only of local heating or background radiation. One can deduce that the weld is not a full penetration weld and lacks fusion.

Figure 6:
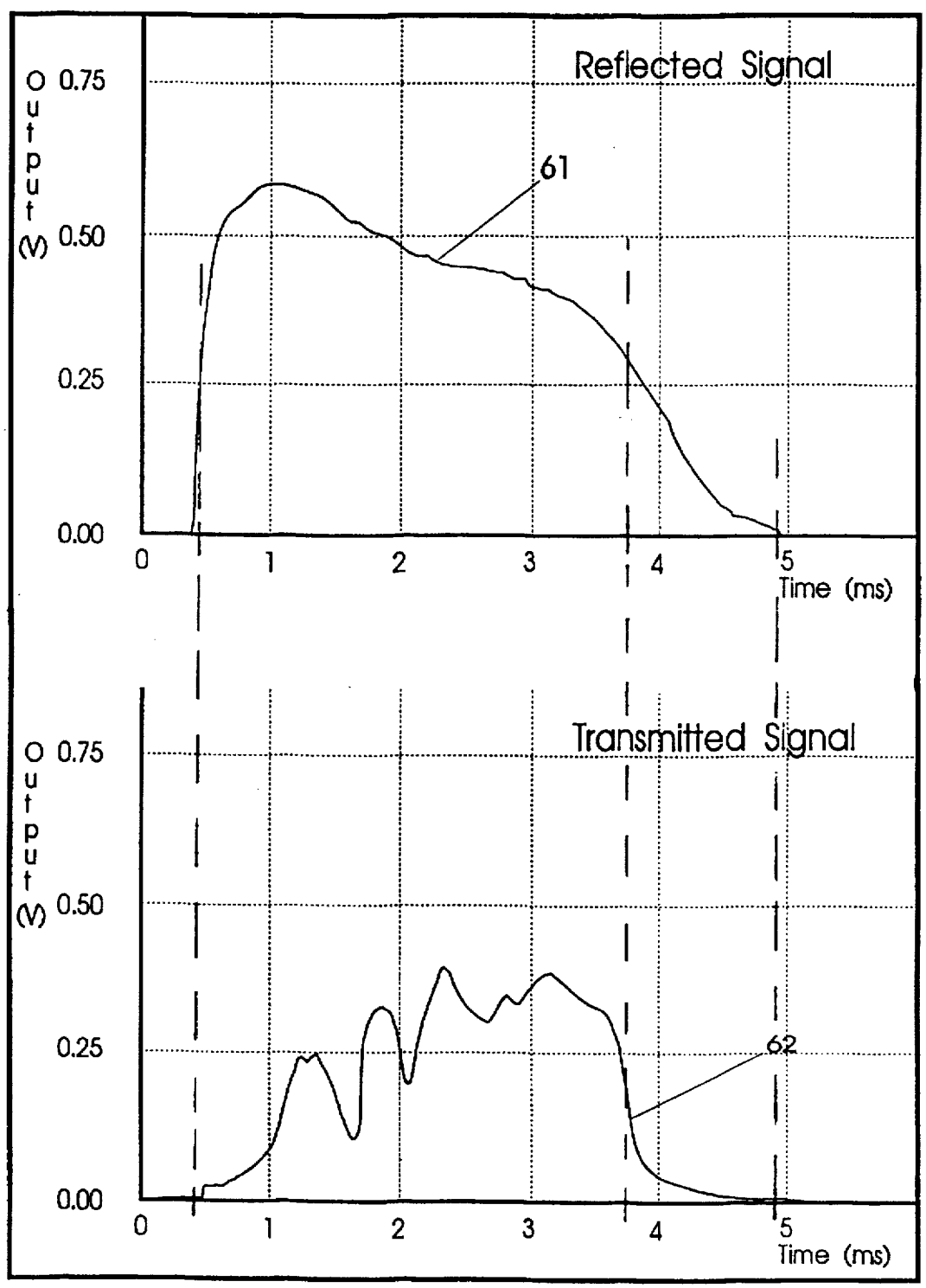
FIG. 6 is a representation of another type of "Bad/Unacceptable" weld signatures.

FIG. 6 is a representation of another "Bad/Unacceptable" weld signatures. This is the case where a different material was placed under the beam 13. In this case, both the reflected signal 61 and the transmitted signal 62 are quite different from the corresponding signals shown in FIG. 4. The signal 62 indicates almost immediate "punch-through" with varying transmission and no closure of the thus formed hole.

Figure 7:
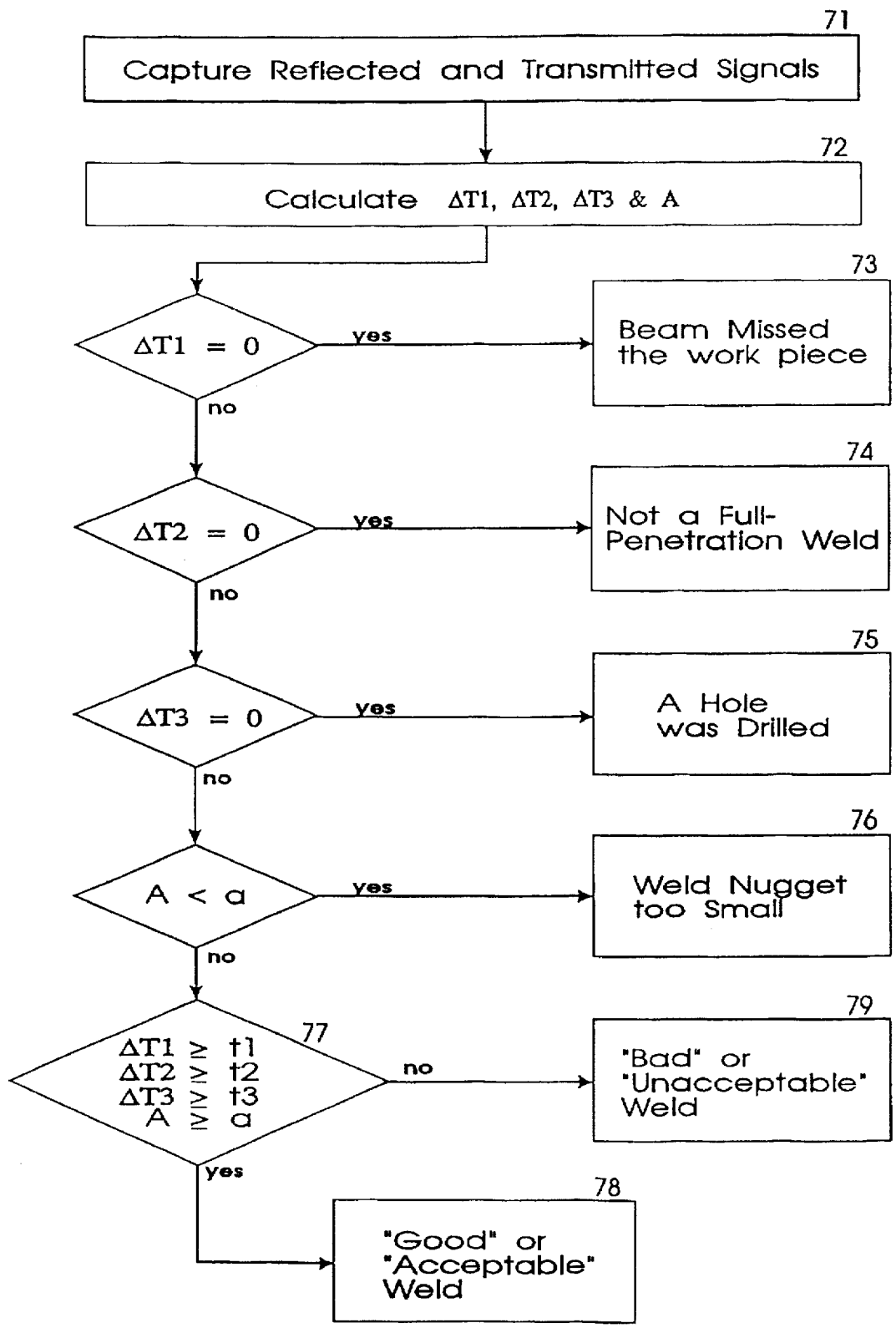
FIG. 7 is a decision tree for a two-sensor system to determine the weld quality.

FIG. 7 is a flow chart which depicts the steps of decision making. First, the monitor system of the present invention captures the weld signatures as per block 71. Then, the monitor system calculates ΔT1, ΔT2, ΔT3, and the area "A" (See FIG. 3C) as per block 72. The monitor will then compare these values with the preset values. These preset values can be determined experimentally by measuring the values of ΔT1, ΔT2, ΔT3, and the area "A" in the "teach mode" of the monitor operation. The decision parameter values may be determined statistically during the teach mode of operation in which the computer 26 of the monitor is taught to remember the signatures of different weld qualities. These values may be adjusted by the operator for appropriate confidence level.

Several different decisions can be made depending on the outcome of the comparison. One can conclude that the beam missed the work piece entirely if ΔT1 is zero as per block 73; no-weld or partial penetration weld if the ΔT2 is zero as per block 74; and a hole is drilled if ΔT3 is zero as per block 75. The value of the area "A" is related to the exit-side diameter of the weld as per block 76.

When all the conditions listed in the block 77 are met, a "Good/Acceptable" weld is produced as per block 78. Otherwise, a "Bad/Unacceptable" weld is produced as per block 79.

Figure 8:
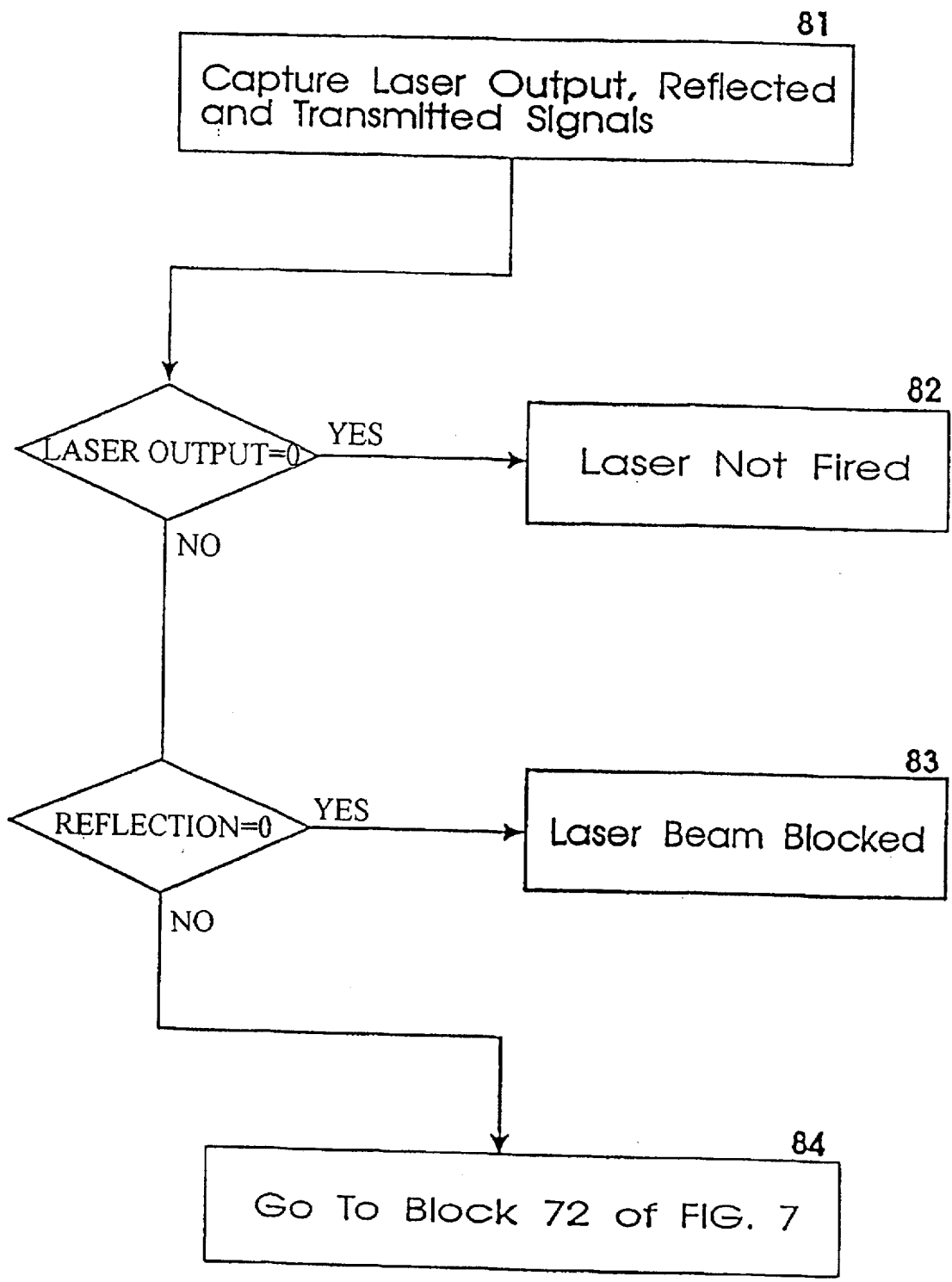
FIG. 8 is a decision tree for a three-sensor system to determine the weld quality.

FIG. 8 is a decision tree for a three-sensor system, i.e., a system which includes laser sensor 25. The addition of the laser output sensor 25 (FIG. 2) allows the system to be more "intelligent". As with the two-sensor system, the first step is to capture the signals as per block 81. The captured signals will then be compared with existing patterns (or templates) that were acquired previously through a "teach mode" of the monitor operation.

The condition that the laser output is zero after the laser firing signal was triggered means that the laser was not fired even though the firing signal was given as per block 82. This condition alerts the operator to inspect the laser and the power supply for necessary corrective actions.

One can conclude that the laser beam was blocked if the reflected signal is zero while the laser output signal is not zero as per block 83. If both signals are not zero, then the decision tree continues to the block 72 of FIG. 7 as per block 84.

The weld monitor system of the present invention can be used to perform an automatic repair welding. If the monitor detected that the weld was not a full-penetration weld as per block 74 of FIG. 7, the monitor is programmed to send a signal to the power supply control 30 of FIG. 2 to increase the power and re-weld. The monitor may be used both for monitoring and for necessary corrective actions to repair the weld defects.

If a hole was drilled instead of a weld as per block 75, the monitor can send a signal to the power supply control to decrease the power, energy, or power density and re-weld at a different location for repair of the defective weld.

The same apparatus shown in FIG. 2 can be used to monitor a laser drilling process. A hole is drilled if the conditions as per block 75 of FIG. 7 are met. The hole diameter may be determined by analyzing the magnitude and/or the area of the signal $\Delta T2$ and the area A.

The foregoing describes a method for monitoring laser welding process. In accordance with the method of the invention, the progressive stages of laser welding can be monitored using photodetector sensors such as photodiodes, phototransistors, photodarlingtons, or pyroelectric sensors and a computer.

The monitoring method enables one to determine the quality of the laser welding, and also provides an opportunity for repair welding. The computer can accumulate the welding results continuously for statistical reports.

The same principle can be applied to different processing such as laser cutting, laser drilling, laser soldering, laser marking and other laser material processing. Depending on the particular process to monitor, one can use various sensors such as detector for electromagnetic emission (light), acoustic emission (sound), thermal energy emission, and vapors from the processing area. Such sensors include photodiode sensors and photodetectors, phototransistors, photodarlingtons, pyroelectric detectors, microphones and acoustic reception devices, infrared and thermal sensors, and spectrometers and monochromators.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A method of automatic process monitoring of a laser spot welding process for joining a first metal member to a second metal member by directing a laser beam onto a spot where the members overlap, the method comprising the steps of:

sensing reflected laser energy from the laser beam impinging on the first member;

sensing transmitted energy of the laser beam passing through the first and second members caused by penetration of the laser beam through the members;

comparing a first time delay between sensing of the reflected energy and sensing of the transmitted energy to a predetermined time delay associated with an acceptable weld; and comparing a second time delay between termination of the sensed transmitted energy and termination of the sensed reflected energy to a corresponding ideal time delay, wherein said first and second time delays provide an indicia of weld quality.

2. The method of claim 1 and including the steps of sensing the laser beam and comparing the sensed laser beam to the sensed reflected energy to confirm impingement of the laser beam on the metal member.

3. The method of claim 1 wherein each of the steps of sensing includes the steps of positioning a photosensor in the reflected and transmitted energy paths.

4. The method of claim 1 and including the step of comparing a time duration of the sensed transmitted energy to an ideal time duration for determining weld quality.

5. A method of automatic process monitoring of a laser spot welding process for joining a first metal member to a second metal member by directing a laser beam onto a spot where the members overlap, the method comprising the steps of:

sensing formation of a keyhole by penetration of the laser beam through the overlapping members; and analyzing energy characteristics of the laser beam at the keyhole to determine weld quality including measuring the time for closure of the keyhole after termination of the laser beam and comparison of the measured time to a predetermined ideal time.

6. The method of claim 5 and including the step of adjusting laser beam energy in response to the step of analyzing for adjusting the energy characteristics to obtain satisfactory weld quality.

7. The method of claim 5 wherein the step of analyzing further includes the steps of measuring the time between contact of the laser beam on the metal member and creation of the keyhole and comparison of the measured time to a predetermined ideal time.

8. The method of claim 5 wherein the step of analyzing includes the steps of:

sensing an initial reflection of a portion of the laser beam from an impact surface of a first one of the metal members;

sensing initial formation of the keyhole;

determining elapsed time between the initial reflection and keyhole formation; and comparing the determined elapsed time to an elapsed time characteristic of an ideal weld.

9. The method of claim 5 wherein the step of analyzing includes the steps of:

sensing an energy envelope of the laser beam;

sensing an energy envelope of laser energy reflected from a surface of the metal members exposed to the laser beam; and comparing characteristics of the energy envelopes of the laser beam and reflected laser energy to determine weld quality.

10. The method of claim 9 wherein the step of comparing includes the step of comparing termination times of each of the energy envelopes wherein an extension of the energy envelope for reflected energy beyond termination of the laser beam energy envelope is indicative of excess energy in the laser beam.

11. The method of claim 9 wherein the step of comparing includes the step of comparing slopes of the energy envelopes to determine reflectivity of the metal members.

12. The method of claim 9 and including the step of sensing an energy envelope of laser energy transmitted through the keyhole to determine weld nugget dimension.

13. The method of claim 12 wherein the weld nugget dimension is determined by the step of measuring time duration of the transmitted energy envelope and comparison of the time duration to a time duration characteristic of a prior known weld nugget.

14. The method of claim 12 wherein one step of sensing includes the step of measuring time duration, magnitude and termination time of the transmitted laser energy envelope.

* * * * *